Jan. 12, 1943. G. D. DILL 2,307,997
PROCESS OF REDUCING METALLIC OXIDES
Filed April 11, 1942
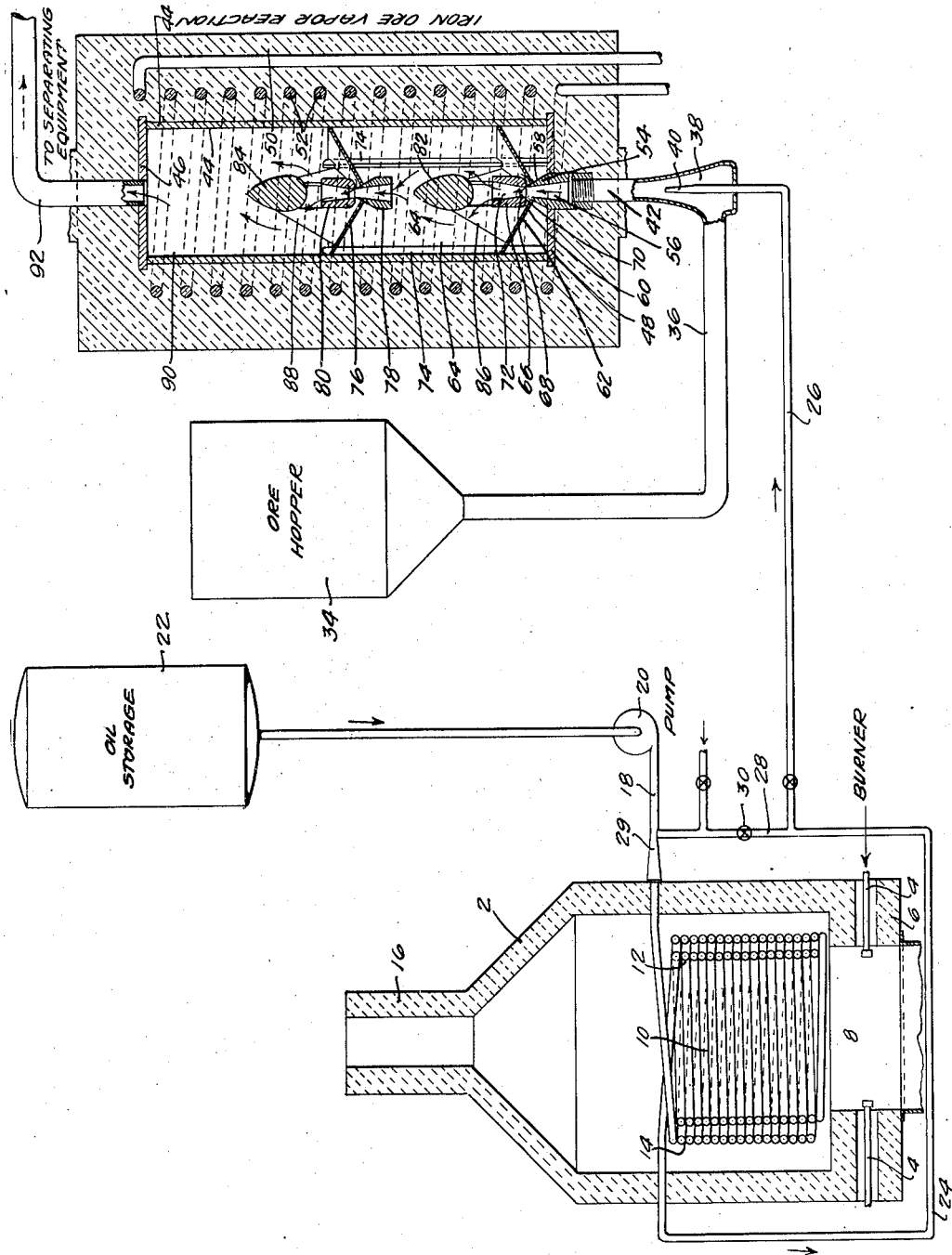
INVENTOR
GILBERT D. DILL
BY
Newell and Spencer and Safford
ATTORNEYS Patented Jan. 12, 1943

2,307,997

UNITED STATES PATENT OFFICE 2,307,997

PROCESS OF REDUCING METALLIC OXIDES

Gilbert D. Dill, Mount Lebanon, Pa.

Application April 11, 1942, Serial No. 438,587

6 Claims. (Cl. 75—26)

This invention relates to the direct reduction of metallic oxides, such for example as the oxides of iron, by the use of reducing agents which are comprised of or include hydrocarbons.

Attempts have been made heretofore to employ hydrocarbons as reducing agents without first converting the hydrocarbons into carbon monoxide and hydrogen. These attemps have not been attended with much success for the reason that in the arrangements heretofore provided for their utilization as reducing agents the hydrocarbons do not get hot enough in the reducing operation to break up into hydrogen and carbon but to a considerable extent pass up the stack unaltered. Hydrocarbons in themselves are not very active reducing agents.

Since the breaking up of hydrocarbons into carbon monoxide and hydrogen is an endothermic reaction, it will be seen that if this reaction takes place in the reducing zone, when treating iron oxide, for example, it tends to produce a thermal condition interfering with the reduction operation. If it be attempted to apply the heat for this reaction, as well as for the reduction reaction, by external heating means, the amount of heat required to be conducted through the walls of the reaction chamber may produce zones of excessive heat, causing local melting or sintering of the oxides which will not only interfere with the reduction operation but will usually clog the reduction apparatus.

Attempts to preheat the hydrocarbons to the desired temperature to insure the desired heat conditions in the reduction zone have usually resulted in such decomposition of the hydrocarbons as to cause fouling and clogging of the preheating apparatus.

The present invention aims to overcome the difficulties heretofore encountered in the utilization of hydrocarbons for direct reduction by providing a process in which the ore or oxide to be reduced can be brought into intimate association with the hydrocarbons at such temperatures and under such conditions as will insure a quick and complete reduction of the ore and an economical use of the reducing agent. The invention aims particularly to make possible the utilization of the superheated vapors of hydrocarbon oils as well as hydrocarbons in a normally gaseous state.

A further object of the invention is to insure association of the ore or oxide and the reducing agent for a sufficient length of time for complete removal of the oxygen. Still another object of the invention is to insure such intimate contact of the material to be reduced and the reducing agent that the necessary reaction will take place.

The invention furthermore aims to provide a reduction process, in which hydrocarbon reducing agents may be employed, which can be practiced continuously.

It is well known that when iron oxides, either of the formula $Fe_2O_3$ or of the formula $Fe_3O_4$, are caused to be intimately mixed with carbon and hydrogen, at elevated temperatures, the carbon and the hydrogen will unite with the oxygen in the oxide ore and form $CO$, $CO_2$, and $H_2O$ and leave as a residual product pure iron, Fe. The present invention, as hereinabove pointed out, aims to utilize hydrocarbons, containing the carbon and the hydrogen combined, without first transforming them to bring the carbon and the hydrogen into the elemental state or even into the water gas form of hydrogen and carbon monoxide.

More particularly, the invention aims to take iron oxide or other metallic oxide, after it has been prepared mechanically to expose the greatest possible surface, and contact it with a gasified hydrocarbon or a superheated vaporized hydrocarbon oil at temperatures above those at which CO readily decomposes, that is between 1200° and 2000° F., at which temperatures the hydrogen and carbon of the hydrocarbon will take up the oxygen from the oxide and effect a reduction of the oxide to the metallic state.

The introduction of the hydrocarbon vapor into the reduction zone at the desired temperature is made possible by the discovery, described and claimed in my co-pending application Serial No. 337,115, filed May 25, 1940, that hydrocarbon oils can be vaporized and raised to relatively high temperatures, above the known cracking temperatures, without carbon deposit, by the utilization of a high velocity circulatory system such as shown and described in said application. In the vaporizing and superheating apparatus described and claimed in my co-pending application, deposit of carbon in the heating coils is prevented by by-passing a portion of the heated hydrocarbon vapor into the inflowing stream of liquid hydrocarbon whereby a high velocity of flow of a mixed stream of vapor and liquid is effected both through a part of the apparatus insulated from the radiant heat of the heating means and through the radiant heat zone itself.

The initial mixing of the highly heated vapor with the unvaporized fluid not only causes high velocity of flow but prevents the local overheating which is apt to take place with full tube operation and also prevents the formation of zones in the stream where there is no liquid and in which overheating of the tubes can take place. In this apparatus it will be seen that a very high state of turbulence is maintained in the tubes throughout the travel of the mixed stream of vapor and liquid through the tubes and that this state of turbulence, with the high velocity flow, insures a uniform wetting of the tubes, a wiping action that removes carbon deposit and an avoidance of local overheating which tends to prevent the carbon deposit in the first place.

In practicing the novel process of the present invention, which will now be described in its application to the reduction of oxides of iron, although it is to be understood that it is equally applicable to the reduction of other metallic oxides, the iron ore to be reduced will first be crushed to that degree of fineness necessary for removal of the gangue to the desired degree, which in most cases will be from 60 mesh up to 100 mesh or even finer, depending upon the character of the ore. The crushed ore will then be treated to separate the oxide from the gangue or impurities, after which treatment the resultant concentrate will consist mainly of $Fe_2O_3$ or $Fe_3O_4$.

After concentration the powdered ore is thoroughly heated and brought to the desired reduction temperature, which will be below the melting point of the iron and any still retained impurities. For best results this temperature should be between 1200° F. and 2000° F., and preferably will be at least 1500° F. At this temperature the heated ore is brought into intimate association with the gasified or superheated vaporized hydrocarbon which has been preheated, preferably to substantially the same temperature as the ore. This superheating of the vaporized hydrocarbon can be effected, as above pointed out, in the vaporizing and superheating apparatus of my copending application hereinabove identified.

In order to insure the intimate association of the heated ore and the heated hydrocarbon essential to cause the reduction reaction to take place and in order to maintain this association sufficiently long to complete the reduction, it has been found advantageous to employ special apparatus such as that disclosed in my application for U. S. Letters Patent Serial No. 341,478, filed June 20, 1940, which is a continuation in part of my application Serial No. 244,612, filed December 8, 1938. In the types of apparatus set forth in the applications for Letters Patent just referred to, turbulence is set up in the fluid stream by causing it to pass in succession through zones of higher than average velocity and lower than average pressure and of lower than average velocity and higher than average pressure. In this apparatus the heated oxide may be caused to partake of the turbulent movements of the superheated hydrocarbon vapor or gas thus insuring not only an intimate commingling of the hydrocarbon with the oxide, but a commingling of the particles of the oxide with each other. The apparatus thus brings about both a reaction between the fluid and the solid and a rubbing action between the oxide particles themselves. In the apparatus described in said applications, provision is also made for selective recyling of the particles whereby those requiring more extended treatment will receive such treatment.

The operation of the apparatus of my co-pending applications can be so governed and the temperatures therein so maintained that the commingled particles of ore and vapor will remain in their interactive and reactive relation to each other for a definite period of time, and at more or less definite temperature and pressure, to insure the desired complete reduction. During this reducing process a further separation of the metallic oxide from the gangue will take place because of the fracturing or degradation due to the high temperatures and due to the impinging effect upon the particles as they are driven against the baffles of the apparatus of said co-pending applications and, to some extent, against each other.

At the end of the period of reaction and interaction in the reactor, the mixture of iron and residual gases, and possibly some residual vapor, will be passed into dry collectors or other separators such as are well known and in general use for separating finely divided solids from fluids where the solid Fe will be separated from the residual gases and/or vapors and from any gangue that may have been separated from the oxide in the reaction chamber. The substantially pure iron or other metal can then be consolidated, shaped and formed by extrusion, compression, rolling or forging into finished products and preferably in such manner as to make use of the residual heat of the reduction operation.

The residual gases can be used as a source of fuel to supply the necessary heat involved in the various operations, such as the preheating of the oxide and the hydrocarbon. It will be understood that a preheating of the oxide and of the hydrocarbon to temperatures somewhat above the temperature required for the reduction reaction may be desirable to provide heat to supply that lost in the breaking up of the hydrocarbon into its elements and to supply any deficiency due to the endothermic hydrogen and carbon reduction reactions. Additional heat to compensate for the endothermic reactions may be supplied by heating the reaction chamber by external heating means, being careful, of course, not to raise it to a temperature at which melting of any of the impurities still in the ore might take place.

Referring now to the drawing which illustrates apparatus suitable for carrying out the process, this apparatus combining the apparatus illustrated in my co-pending applications Serial Nos. 341,478 and 337,115, hereinabove identified, the hydrocarbon, to be converted into a superheated vapor having more or less the characteristics of a fixed gas, is treated in the apparatus shown at the left of the figure, this apparatus comprising a heating chamber or furnace 2 provided with burners 4 located in the refractory support 6. The flame from each burner projects into the central combustion space 8 bounded by the refractory and also extends somewhat up into the combustion space 10 which is bounded by the inner coil 12 of the tube in which the heating of the hydrocarbon is effected and through which it circulates. The outer coil 14, although located in the heating chamber 2, is shielded from the radiant heat of the flame by the inner coil 12 which is a continuation of the outer coil 14. These coils may rest upon and be partly supported by the refractory 6. The products of combustion pass out through the stack 16.

As shown in the drawing, the hydrocarbon oil to be vaporized and superheated passes through the outer coil 14 before it enters the inner coil 12 in the heating chamber, the outer coil 14 having an extension 18 outside the chamber 2 into which the hydrocarbon oil is forced by a pump 20 that receives it from a storage or supply tank 22. The oil, after it has passed through the outer coil 14 and through the inner coil 12 and has been vaporized and superheated, passes out of the heating chamber through the extension 24 of the inner coil 14. The extension 24 has two branches, one of which, 26, conducts the vaporized and superheated hydrocarbon to the point of use, for example, to the reaction apparatus shown which is of the type disclosed in my co-pending application Serial No. 341,478, filed June 20, 1940. The other branch 28 constitutes a by-pass connecting the output extension 24 of the inner coil 12 with the input extension 18 of the outer coil 14. Located in the by-pass 28 is a valve 30 for controlling the amount of superheated vapor to be by-passed from the output extension 24 into the input extension 18 and also the pressure drop through the by-pass. If additional pressure drop is desired the by-pass 28 may connect with a venturi 29 in the input 14, as shown. The venturi also contributes to setting up of turbulence in the combined stream of vapor and liquid.

By providing the by-pass 28, together with its control valve 30, a part of the vaporized and superheated hydrocarbon may be introduced into the liquid hydrocarbon which is being forced into the outer coil 14 through its extension 18 by the action of the pump 20. The superheated vapor is introduced in a sufficient amount in respect to its contained heat, so that it will not be condensed in the liquid but will sweep along with the liquid hydrocarbon, as it enters the outer coil 14, as a combined stream of vapor and liquid. The vapor and liquid will sweep through the coil 14 together, the liquid being in a sense entrained in the vapor stream, a result growing out of its rapid flow. It will be seen that the pressure built up by the vaporization of the hydrocarbon in the coils 12 and 14, and particularly in the coil 12, will provide the desired pressure drop for obtaining the desired velocity of flow of the vaporized hydrocarbon through the by-pass 28 and the outer coil 14 as well as through the inner coil 12.

In this manner a relatively high velocity of flow may be maintained of the combined stream of liquid and vapor and a very high degree of turbulence.

As shown at the right hand side of the figure of the drawing, the finely divided ore to be reduced may be contained in a hopper, shown conventionally at 34, and which may be heated in any suitable manner to provide for preheating of the ore or which may hold ore preheated before it is introduced into the hopper, connected by any suitable conduit 36 with an injection chamber 38 into which the pipe 26 from the superheater extends, this pipe 26 being provided at its end within the chamber 38 with a nozzle 40 through which the superheated vapor is discharged into the narrow upper part of the chamber 38 which merges with the straight section of tubing 42 constituting a part of the conduit for the fluid entering the reaction chamber. It will thus be seen that as the superheated hydrocarbon vapor is discharged from the nozzle 40 it will entrain with it the finely divided ore entering the chamber 38 from the hopper 34 and carry it up into the reaction chamber of the reducing apparatus.

As more fully described in my co-pending application Serial No. 341,478, hereinabove identified, the chamber or chambers in which the reduction is to take place, hereinafter referred to as "reaction" chambers, are enclosed within a cylindrical side wall 44 and top and bottom walls 46 and 48. As shown, the entire casing may be enclosed within an insulating cover 50 and may be provided with any suitable heating means as, for example, electric resistance wires 52.

The straight section of tubing 42, constituting the upper part of the housing in which the chamber 38 is located, has connected to its upper end one section 54 of a venturi, the section 54 having a comparatively steeply tapering interior passage 56 to produce the desired increase in velocity and reduction in pressure of the inflowing fluid.

The outer face 58 of the upper end of the section 54 is also conical and tapers to meet the interior passage 56 in a comparatively sharp edge 60, the tapered upper end of the section 54 extending through the bottom of an inverted frusto-conical partition or baffle 62 in the casing 44 which forms the bottom of the reaction chamber 64 and serves as a hopper-like structure to direct the fluid and any entrained solid to be recirculated to the low pressure part of the venturi, more fully to be described hereinafter.

Positioned above the upper end of the section 54 of the venturi is a section 66 in which is formed the expansion end of the venturi, the section 66 having at its lower end a bell-mounted opening 68 of an internal conical taper substantially corresponding to the external conical taper of the outer face 58 of the section 54 and being spaced from the tapered upper end of the section 54 sufficiently to provide an annular passage 70 into the passage through the Venturi section 66. The conical or bell-mouthed lower end 68 of the passage through the section 66 of the Venturi structure connects at its upper end with the expansion part 72 of the venturi which at its upper end discharges into the reaction chamber 64.

From the foregoing description it will be seen that the superheated hydrocarbon vapor entering the tube 42 from the jet 40 and flowing under a substantially uniform flow-impelling pressure will, as it is forced through the contracting passage 56 in the section 54, travel under the well known law of the flow of fluids at an increased velocity and at a reduced pressure through the upper end of the passage 56 and will be projected into the bell mouth 68 in the section 66 at this increased velocity. There will thus be in the confined flow of the fluid a region of low pressure with which the annular passage 70 communicates, thus creating a suction tending to draw the surrounding fluid into this passage for recirculation together with any finely-divided ore or other solid that may be entrained in the fluid.

Spacer bars 74 support a second frusto-conical partition member 76 in such position as to divide the space within the casing 44 into two chambers, the partition member 76 supporting a second venturi comprising a member 78 of an internal and external construction similar to the member 54 and another member 80 of an internal and external construction similar to the member 66 of the lower venturi.

Located above the expansion ends of the respective venturis are streamlined baffles 82 and 84, the baffle 82 being supported by three brace members 86 connected at their upper ends to the baffle 82 and at their lower ends to the inner face of the partition member 60 and the baffle 84 being supported by similar brace members 88. The Venturi sections 66 and 80 are also shown as supported in their proper relations to the sections 54 and 78 by connections to the respective sets of brace members 86 and 88.

From the foregoing description, it will be seen that the superheated hydrocarbon, with its entrained finely divided ore, as it enters the reaction chamber 64 through the passage 72 in the upper part of the lower venturi will travel from a zone of high velocity and reduced pressure to a zone of low velocity and higher pressure and at the same time the stream of mixed superheated vapor and finely divided ore will strike against the blunt end of the streamlined baffle 82. A part of the stream, following the streamlining of the baffle 82, will go on into the passage in the lower member 78 of the upper venturi while a part will be directed toward the side wall of the lower chamber 64 and will return downward and enter the passage 70 into the low pressure part of the lower venturi. There is thus brought about both a marked turbulence in the stream insuring intimate reaction between the reducing agent and the ore and a recycling of the particles usually the larger particles needing more extensive treatment, with the result that the reduction is usually substantially completed before the mixed stream of superheated hydrocarbon and finely divided ore enters the upper venturi. If, however, the reduction has not been completed in the lower chamber, it will doubtless be completed in the upper chamber 90 where the same action and recycling takes place. The reduced ore is carried out together with the gaseous products of the reduction through the discharge pipe 92.

From the foregoing description it will be seen that by the process of the present invention the possibility of using hydrocarbons as reducing agents, without first breaking them up into their constituent elements or even using them to form water gas, has been realized and that in this manner the direct reduction of metallic oxides can be brought about with a comparatively economical use of hydrocarbons, in fact, a much more economical use of the hydrocarbons than by any prior method of employing hydrocarbons for reduction purposes of which I am aware.

This application is a continuation in part of my application Serial No. 335,764, filed May 17, 1940, for Process of reducing metallic oxides.

What is claimed as new is:

1. That improvement in the art of reducing metallic oxides, which consists in heating the oxide, in a concentrated and finely divided condition, to a temperature in the reduction range and also above that at which CO readily decomposes but below the melting point of the metal, preheating a fluid hydrocarbon to substantially the same temperature, by forcing said hydrocarbon at high velocity through a zone of superheat and accelerating its velocity and insuring turbulence by reintroducing into the stream of hydrocarbon entering the superheating zone a portion of the hydrocarbon leaving the superheating zone, effecting an entrainment of the heated finely divided oxide in the heated hydrocarbon fluid and its intimate association therewith and maintaining the oxide and hydrocarbon fluid in such intimate association and at reduction temperature until the reduction is completed.

2. A process according to claim 1, in which the finely divided oxide is preheated to a temperature between 1200° F. and 2000° F. and in which the fluid hydrocarbon is preheated to substantially the same temperature.

3. A process according to claim 1, in which separation of the reduced iron from the fluids with which it is commingled is effected while the iron still retains at least some of the heat from the reducing zone.

4. A process according to claim 1, in which the hydrocarbon fluid is brought into a turbulent condition and the oxide is caused to partake of the turbulent movements of the fluid.

5. A process according to claim 1, in which provision of sufficient excess heat is made in the preheating of the oxide and of the hydrocarbon fluid to compensate for consumption of heat incidental to the decomposition of the hydrocarbon fluid during the reduction reaction.

6. A process according to claim 1, in which heat is also conducted to the reduction zone to replace that consumed by the endothermic reactions which take place there.

GILBERT D. DILL.